United States Patent

[11] 3,556,318

| [72] | Inventor | Clinton R. Hollis |
| | | Camden, Ark. |
| [21] | Appl. No. | 829,015 |
| [22] | Filed | May 29, 1969 |
| | | Division of Ser. No. 712,858, Mar. 13, 1968, Patent No. 3,506,143. |
| [45] | Patented | Jan. 19, 1971 |
| [73] | Assignee | International Paper Company |
| | | New York, N.Y. |
| | | a corporation of New York |

[54] DUNNAGE BAG
5 Claims, 3 Drawing Figs.

[52] U.S. Cl. .................................................. 214/10.5, 229/55, 229/62.5
[51] Int. Cl. .................................................. B65g 1/14, B65g 1/20, B65d 33/16

[50] Field of Search ........................................... 229/53, 55, 62.5; 206/(Inquired); 214/10.5, 10.5i

[56] References Cited
UNITED STATES PATENTS

| 3,058,647 | 10/1962 | Reiselt........................ | 229/55 |
| 3,072,270 | 1/1963 | Tolby et al.................. | 214/10.5 |
| 3,462,027 | 8/1969 | Puckhaber.................. | 214/10.5 |

*Primary Examiner*—David M. Bockenek
*Attorney*—Charles B. Smith

ABSTRACT: An inflatable and disposable dunnage bag having an airtight bladder enclosed in a multi-ply container folded along parallel fold lines so that the bag, when not inflated, is flat with a back wall and a front wall, the corresponding plies in the back and front wall of the container being joined to each other by tapes extending along the end of the walls and adhesively secured to the ends of the plies.

DUNNAGE BAG

This application is a division of U.S. Pat. application Ser. No. 712,858, filed Mar. 13, 1968, U.S. Pat. No. 3,506,143 and relates to dunnage for use in shipment of freight by rail, ship, truck, aircraft, and the like, and, more particularly, to a disposable dunnage bag for such use.

When transporting freight by rail, ship, truck, aircraft, and the like, it is customary to fill or bridge the space left between the freight or walls of the freight carrying compartment to prevent the freight from shifting and damaging the freight and compartment. Preventing shifting and damage to the freight and compartment are, of course, important but the time, labor and costs involved in installing, filling or bridging materials before shipment, removing such materials after shipment and disposing of the removed filling or bridging materials has heretofore, added substantially to shipping costs.

To reduce the time and labor of installation and removal, more recently inflatable dunnage bags have been used to bridge the space. The deflated bag is inserted into the space and inflated through a valve in the container wall. On such bag has been made of rubber and canvas and, because of the bag cost, is usually deflated and returned to the shipper for reuse. In order that such bag may be reused, it must, of course, be deflated and handled with care and must be accounted for and returned to the shipper. This adds to the cost of this type of bag.

Attempts to make a less costly bag which, after use, could be economically disposed of have met with limited success. One such attempt has been to form a multiwall tube having outer walls of kraft paper, overlapped and glued longitudinally along the tube, with a bladder in the center of the tube of high density polyethylene, rubber or the like, and to seal the ends of the tube with rods and metal clamps. Such clamped end tubes, although less expensive than rubber and canvas, are not fully satisfactory because of the cost of the clamps. Moreover, such clamps are rigid and, unless such bag is properly positioned and handled, the rigid clamps can damage the freight container, and adjoining bags.

In the instant invention, a disposable dunnage bag is formed by enclosing an airtight bladder of high density polyethylene, rubber, or the like, in a multi-ply container. The multiply container is made up of a plurality of sheets, superimposed one over the other in the longitudinal or machine direction of the sheets. Each sheet is folded along parallel fold lines so that the sheet is flat with a back and front wall between the fold lines and with one of its longitudinal edges overlapping the other longitudinal edge. Where the longitudinal edges of each sheet overlap, the overlapped edges are glued to form a seam extending in the longitudinal, machine direction, of the sheet. Each outer sheet is folded, and the edge overlapped and glued, after the preceding inner sheet has been folded, lapped and glued so that, when all the sheets have been folded, overlapped and glued, the sheets are not connected to each other. When expanded, the sheets form a multiwall or multi-ply tube with each inner sheet or ply in contact with the immediately adjacent outer sheet so that the sheets, or plies, reinforce each other. The sheets may be superimposed, folded, edge lapped and glued on a tubing machine, preferably, with the overlapped seamed edges of the sheets offset with respect to each other so that the seam on one ply does not overlay the seam on the adjacent plies.

The airtight bladder which, when inflated expands, into contact with the inner wall of the inner ply is supported by the multi-ply walls of the container. A valve is attached to the bladder and extends through the walls of the container where it is accessible for inflating the container.

In the manufacture of the dunnage bag, the bag is flat and, for shipment and storage before use, may remain flat. The bladder, which may be a seamless tube of polyethylene, rubber or the like, cut to the desired length and glued or heat sealed at its opposite ends, a sheet folded at one edge and glued or heat sealed along its other three edges, or two sheets glued or heat sealed along all four edges, is inserted into the collapsed, or flattened, multiwall container. The container is cut to a length to accommodate the bladder and the ends of the container are sealed by tapes extending the length of the ends and glued to both sidewalls. Preferably, when flat, the length and width of the container, at its inner wall, are the same, or slightly smaller than, the bladder.

The invention will be understood from the following description and drawings, in which.

Figure 1:
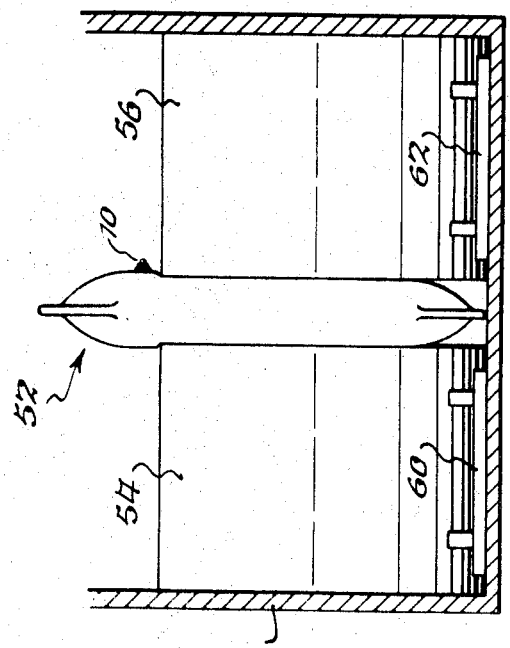
FIG. 1 is a perspective plan view of the bladder of the bag of the instant invention.
Figure 2:
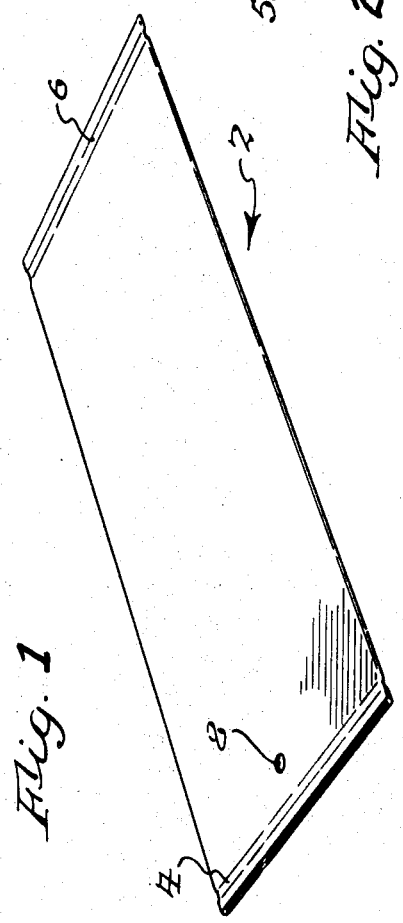
FIG. 2 is a side view of the bag of the instant invention showing the bag in place and inflated between the ends of paper rolls for shipment of the rolls.
Figure 3:
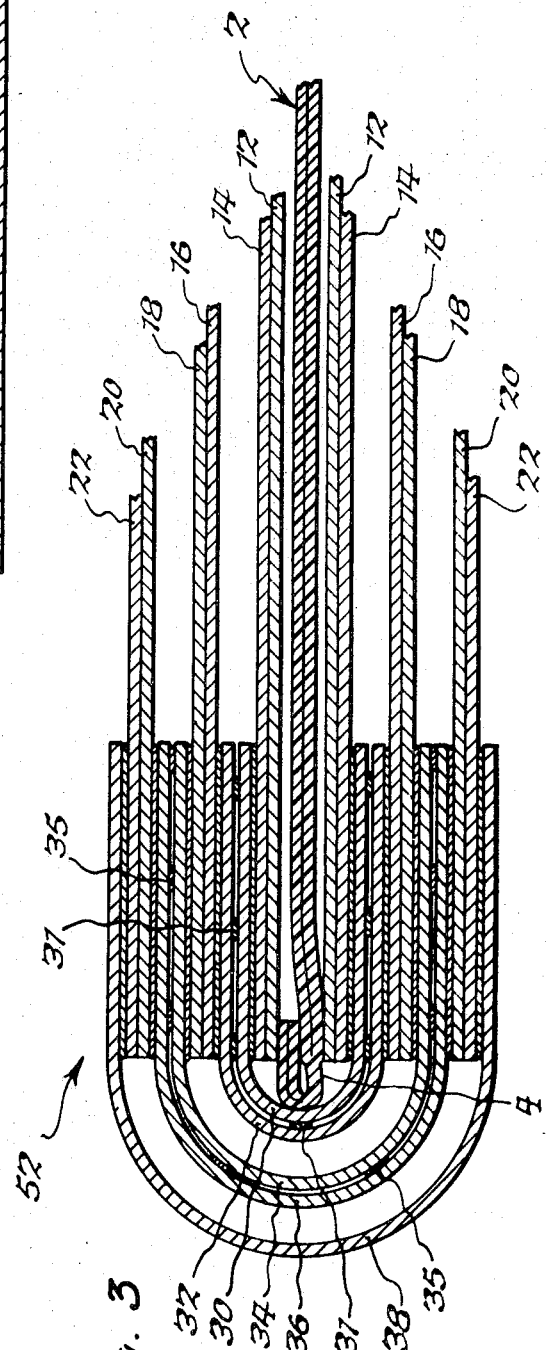
FIG. 3 is a cross-sectional view taken at one end of the bag and showing the bladder, plies and tapes, as the bag end is assembled in accordance with the instant invention.

Referring to FIGS. 1, 2 and 3 the bladder, generally designated 2, is cut to the desired length from a tube of air impervious material, such as polyethylene, and heat sealed, or glued, at its opposite ends along lines 4, 6. Hole 8, for receiving the end of valve 10, is cut in one wall of bladder 2 and valve 10 is attached and clamped, glued, or heat sealed to bladder 2, forming an airtight connection between valve 10 and the wall of bladder 2. Thus, when inflated through valve 10, as hereinafter described, bladder 2 expands and the air introduced into the bladder through valve 10 is entrapped and remains sealed in bladder 2 until valve 10 is opened or bladder 2 is torn or ruptured.

Bladder 2 is encased, or enveloped, in a multi-ply container made up by a plurality of sheets 12, 14, 16, 18, 20 and 22 superimposed, one over the other, and folded so that the longitudinal edges of each sheet overlap and the overlapped edges of each sheet are adhesively secured to form a longitudinal seam. Preferably, the sheets are folded and the longitudinal edges are overlapped and secured on a tubing machine with the overlapped seamed edges of the sheets staggered longitudinally of the tube with the seam of one tube offset relative to the seams of the adjacent tubes. In folding, lapping and securing the edges on a tubing machine, the multi-ply tube, formed in the preferred embodiment with six paper sheets or plies, is a continuous flattened tube from which the containers are cut in suitable length.

The width of the outer edge of flattened bladder 2 and each of the plies 12, 14, 16, 18, 20 and 22 is the same as, or slightly wider than, the width of the inner diameter of the next outer ply member. This is of substantial importance because, when inflated, the bladder does not stretch, is not weakened and is fully supported by the plies of the container.

When closed, the inner wall of the multi-ply container, at the opposite ends of bladder 2, is slightly shorter than the seal of bladder so that the sealed ends 4, 6, at the ends of bladder 2 bear against the end of the multi-ply container or bladder 2 at the pressure side of sealed end 4, 6 bear on the end of the container. Thus, at its ends, bladder 2 is not stretched or weakened when the dunnage bag of the instant invention is inflated. Except for valve 10, which projects outwardly through the plies of the container, bladder 2, although contained within, is free of any connection to the container.

The plies of both walls are cut at the same length flush with the seal, or slightly shorter than the seal of bladder 2. The opposite open ends of the container are closed with tapes, cut to a length not longer than the width of the open container end. The tapes are adhesively secured to the ends of the plies on the opposite sides of the end opening.

As will be described in fuller detail, the tapes, before they are folded and adhesively secured to the ends of the various plies, may be lightly tacked together, in pairs, with an adhesive. One of the tapes in such pair, is adhesively secured to the outer surface of a ply at the opposite sides of the end opening and, simultaneously, the other tape of the pair is adhesively secured to the inner surface of the adjacent ply. By simultaneously applying the tapes in this manner manufacture is simplified.

Referring to FIG. 3, plies 12, 14, 16, 18, 20, 22 are cut so that their ends are slightly shorter than the end of bladder 2 so that the sealed ends 4, 6, of bladder 2, or the bladder in the pressure side of sealed ends 4, 6, will bear on and be reinforced by the container and closures. Strips 30, 32, of a length no longer than, and preferably slightly shorter than, the width of the container end opening, are tacked together at 31 with a suitable adhesive and an adhesive coating, such as, polyethylene, a hot melt or pressure sensitive adhesive coating, is applied to the outwardly facing surfaces of tapes 30, 32 along the longitudinal edges of the tape to be adhesively secured to the ends of the container plies. The tapes are folded and the adhesive coated ends are inserted between the ends of the plies and pressure, with or without heat depending upon the adhesive used, is applied to adhesively secure the ends to the adjacent plies, in contact with each tape, to the tape. Similarly, tapes 34, 36, tacked along their length with adhesive 35, and with an adhesive applied to the outwardly facing longitudinal edge surfaces of tapes 34, 36, are folded, inserted between the ends of adjacent plies and, with pressure, with or without heat, adhesively secured to the ends of the plies. Tape 38, with adhesive applied, along its longitudinal edge is longitudinally folded, brought into contact with the outer surfaces of ply 22 and with pressure, with or without heat depending upon the adhesive used, adhesively secured to the ends of outer ply 22.

The adhesive tacking of tape 30 to 32 and 34 to 36 maintains the tapes in position while they are folded and secured to the ends of the plies but does not hold the tapes together during inflation of the container with air nor prevent one ply from moving or shifting on its adjoining plies. Thus, as the container is inflated or in use, the various plies can move or shift relative to each other to distribute the load or forces without tearing or ripping of any of the plies. This is of substantial importance because, if the plies are torn or ripped during inflation the container is weakened. Furthermore, where a tear or rip occurs after the container is inflated, the tearing or ripping of one ply will not cause a pulling, tearing or ripping of the adjacent adjacent plies.

Referring now to FIG. 2, showing an inflated dunnage bag of the instant invention in place between the ends of paper rolls for shipment to the rolls, the bag of the instant invention, generally designated 52, is positioned between the ends of paper rolls 54, 56 in container 58 which may be a freight car, ship, truck or aircraft. Because paper rolls 54, 56, are round, the rolls are held from rolling by chocks 60, 62. Rolls 54, 56 may be rolled into place or placed in compartment 58 with a lift truck or other suitable handling equipment. Dunnage bag 52, which is deflated and flat, is inserted between the facing ends of rolls 54, 56 and, through valve 10, bag 52 is inflated to a pressure of about 8 pounds p.s.i. to set the load. After the load is set dunnage bag 52 is deflated, through valve 10, to a pressure of from about 2 to 4 pounds p.s.i. for shipment. By first inflating the bag to a higher pressure to set the load and, thereafter, deflating the bag to a lower pressure, the freight to be held by the inflated bag during shipment is moved into abutment with the container walls or other items of freight being shipped.

When the freight reaches its destination, the inflated bag 52 may be ripped open with a knife, freight hook or similar tool and, when ripped open, the bag rapidly deflates. The deflated bag can then be removed and disposed of, such as, by burning. Rapid deflation of the bag by tearing or ripping of the container avoids delays in unloading of the freight.

The strength of the bag of the instant invention will, of course, depend upon the strength and quality of the material in the plies of the multi-ply container. For most purposes for which the dunnage bag of the instant invention is intended, it is preferred to make the container from 100 pound kraft paper sheets, with the outer sheet or ply coated with, for example, polyethylene, for weather and wear resistance. The container may, however, be made from other sheet materials, such as plastic sheets with or without reinforcement. Preferably, water resistant adhesives are employed in the manufacture of the bag.

The terms and expressions which have been employed are used as terms of description and not of limitation, and there is no intention in the use of such terms and expressions of excluding any equivalents of the features shown and described or portions thereof, but it is recognized that various modifications are possible.

I claim:

1. An inflatable dunnage bag comprising a multi-ply container made up of a plurality of sheets superimposed one over the other and folded along parallel fold lines so that the sheets are flat between the fold lines, forming back and front container walls between the fold lines and with one of the longitudinal edges of each sheet overlapped with, and adhesively secured to, the longitudinal edge of the same sheet; an airtight bladder sealed at its opposite ends in said container; a valve in the wall of said bladder for inflating said bladder; said valve extending outwardly through one of said walls of said multi-ply container and a plurality of folded tapes; each of one said plurality of folded tapes having a first folded side and a second folded side each one of said folded tapes being superimposed one over the other, and extending transversely across the end of each bag substantially from one fold line to the other; each one of said folded tapes being adhesively secured along said first folded side to one of said container walls and along said second folded side to the plies of the other one of said container walls.

2. An inflatable dunnage bag, as recited in claim 1, in which the folded tapes adhesively secured to adjacent plies are secured to the outer surface of one of said adjacent plies and the inner surface of the other of said adjacent plies, respectively.

3. An inflatable dunnage bag, as recited in claim 2, in which said folded tapes adhesively secured to adjacent plies are adhesively tacked to each other across the width of said tapes.

4. An inflatable dunnage bag, as recited in claim 3, in which said sheets are 100 pound kraft paper sheets and the outer sheet of said container is coated with polyethylene.

5. An inflatable dunnage bag, as recited in claim 4, in which said bladder is a polyethylene tube heat sealed at its opposite ends.

UNITED STATES PATENT OFFICE
CERTIFICATE OF CORRECTION

Patent No. 3,556,318　　　　Dated January 19, 1971

Inventor(s)　　Clinton R. Hollis

It is certified that error appears in the above-identified patent and that said Letters Patent are hereby corrected as shown below:

Col. 1, line 43, "multiply" should be -- multi-ply --;

line 56, "multiwall" should be -- multi-wall --;

2, line 1, "multiwall" should be -- multi-wall --;

line 4, "sidewalls" should be -- side walls --;

line 53, after "bladder" (first occurrence) insert -- 2 --;

3, lines 9-10, delete "coating";

line 39, delete "adjacent" (second occurrence).

Signed and sealed this 13th day of July 1971.

(SEAL)
Attest:

EDWARD M. FLETCHER, JR.
Attesting Officer

WILLIAM E. SCHUYLER,
Commissioner of Pate